United States Patent
Wang et al.

(10) Patent No.: US 11,227,168 B2
(45) Date of Patent: Jan. 18, 2022

(54) ROBUST LANE ASSOCIATION BY PROJECTING 2-D IMAGE INTO 3-D WORLD USING MAP INFORMATION

(71) Applicant: QUALCOMM Incorporated, San Diego, CA (US)

(72) Inventors: Tianheng Wang, San Diego, CA (US); Muryong Kim, Florham Park, NJ (US); Jubin Jose, Belle Meade, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 16/715,413

(22) Filed: Dec. 16, 2019

(65) Prior Publication Data
US 2020/0218906 A1 Jul. 9, 2020

Related U.S. Application Data

(60) Provisional application No. 62/789,902, filed on Jan. 8, 2019.

(51) Int. Cl.
G06K 9/00 (2006.01)
G01S 19/45 (2010.01)
G06T 7/73 (2017.01)

(52) U.S. Cl.
CPC .......... G06K 9/00798 (2013.01); G01S 19/45 (2013.01); G06T 7/74 (2017.01); G06T 2207/30256 (2013.01)

(58) Field of Classification Search
CPC .................. G06K 9/00798; G06T 7/74; G06T 2207/30256; G01S 19/49; G01S 19/485; G01S 19/45; G01C 21/3602; G01C 21/28
See application file for complete search history.

(56) References Cited

U.S. PATENT DOCUMENTS

9,151,626 B1 * 10/2015 Kojo .................... B60W 30/12
2015/0260530 A1 * 9/2015 Stenborg ................ G01C 21/30
701/461

(Continued)

FOREIGN PATENT DOCUMENTS

JP 2018077162 A 5/2018

OTHER PUBLICATIONS

Belaroussi R.,et al, "Vehicle Attitude Estimation in Adverse Weather Conditions Using a Camera a GPS and a 3D Road Map", Intelligent Vehicles Symposium (IV), 2011 IEEE, Jun. 5, 2011 (Jun. 5, 2011), pp. 782-787, XP031998995, 6 pages, DOI: 10.1109/IVS .2011. 5940485, ISBN: 978-1-4577-0890-9 the whole document.

(Continued)

Primary Examiner — Carol Wang
(74) Attorney, Agent, or Firm — QUALCOMM Incorporated

(57) ABSTRACT

To make error correction in a position estimate of a vehicle, visual lane markings on the road can be matched with lane boundaries for the road within 3-D map data. Embodiments include obtaining a "stripe" indicative of an observed lane marking captured in a from a camera image, obtaining map data for the road on which the vehicle is located, determining the plane of the road from coordinates of lane boundaries within the map data, projecting the stripe onto the plane, and comparing the projected stripe with lane boundaries within the map data and associating the visual lane markings with the closest lane boundary. Differences between the projected stripe and the associated lane boundary can then be used for error correction in the position estimate of the vehicle.

27 Claims, 13 Drawing Sheets

(56) References Cited

U.S. PATENT DOCUMENTS

| | | | |
|---|---|---|---|
| 2015/0292891 A1 | 10/2015 | Kojo | |
| 2017/0016740 A1* | 1/2017 | Cui | ................... G06K 9/00671 |
| 2017/0169300 A1 | 6/2017 | Heisele et al. | |
| 2018/0336697 A1 | 11/2018 | Lu et al. | |
| 2021/0041263 A1* | 2/2021 | Hirate | ................ G06F 16/2379 |

OTHER PUBLICATIONS

International Search Report and Written Opinion—PCT/US2019/066736—ISA/EPO—dated Apr. 7, 2020.

\* cited by examiner

ROBUST LANE ASSOCIATION BY PROJECTING 2-D IMAGE INTO 3-D WORLD USING MAP INFORMATION

RELATED APPLICATIONS

This application claims the benefit of U.S. Provisional Application No. 62/789,902, filed Jan. 8, 2019, entitled "ROBUST LANE ASSOCIATION BY PROJECTING 2-D IMAGE INTO 3-D WORLD USING MAP INFORMATION," which is assigned to the assignee hereof, and incorporated herein in its entirety by reference.

BACKGROUND

Vehicle systems, such as autonomous driving and Advanced Driver-Assist Systems (ADAS), often need highly-accurate positioning information to operate correctly. To provide such accurate positioning, ADAS systems may utilize positioning technologies from a variety of sources. For example, Global Navigation Satellite Systems (GNSS), such as Global Positioning System (GPS) and/or similar satellite-based positioning technologies can be used to provide positioning data, which may be enhanced with (or substituted by, where necessary) Visual Inertial Odometry (VIO), which uses data from motion sensors (e.g., accelerometers, gyroscopes, etc.) and one or more cameras to track vehicle movement. These systems can be used to provide a position estimate of the vehicle in a global coordinate system (or "global frame").

BRIEF SUMMARY

Techniques provided herein are directed toward accurately associating observed lane markings from camera images to counterpart lane boundaries within a 3-D map. Embodiments include obtaining a "stripe" indicative of an observed lane marking captured in a from a camera image, obtaining map data for the road on which the vehicle is located, determining the plane of the lane from coordinates of lane boundaries within the map data, projecting the stripe from 2-D image to 3-D world based on the plane, and comparing the projected stripe with lane boundaries from the map data and associating the observed lane markings with the closest lane boundary. Differences between the projected stripe and the associated lane boundary can then be used for error correction in the position estimate of the vehicle.

An example method of associating vehicle lane markings on a road with 3-D map data for vehicle position estimation, according to the disclosure, comprises obtaining location information comprising Global Navigation Satellite System (GNSS) information, Visual Inertial Odometery (VIO) information, or both, and obtaining one or more stripes, wherein each of the one or more stripes comprises a 2-D representation of a corresponding lane marking on the road, the 2-D representation derived from a camera image of the corresponding lane marking taken from a vehicle. The method further comprises obtaining the 3-D map data, wherein the 3-D map data comprises a plurality of lane boundaries for an area of the road in which the vehicle is located, determining a vehicle position estimate based at least in part on the location information, the one or more stripes, and the 3-D map data, and providing the vehicle position estimate to a system or device of the vehicle.

An example device for associating vehicle lane markings on a road with 3-D map data for vehicle position estimation, according to the disclosure, comprises a memory and a processing unit communicatively coupled with the memory. The processing unit is configured to obtain location information comprising Global Navigation Satellite System (GNSS) information, Visual Inertial Odometery (VIO) information, or both, and obtain one or more stripes, wherein each of the one or more stripes comprises a 2-D representation of a corresponding lane marking on the road, the 2-D representation derived from a camera image of the corresponding lane marking taken from a vehicle. The processing unit is further configured to obtain the 3-D map data, wherein the 3-D map data comprises a plurality of lane boundaries for an area of the road in which the vehicle is located, determine a vehicle position estimate based at least in part on the location information, the one or more stripes, and the 3-D map data, and provide the vehicle position estimate to a system or device of the vehicle.

Another example device, according to the disclosure, comprises means for obtaining location information comprising Global Navigation Satellite System (GNSS) information, Visual Inertial Odometery (VIO) information, or both, and means for obtaining one or more stripes, wherein each of the one or more stripes comprises a 2-D representation of a corresponding lane marking on a road, the 2-D representation derived from a camera image of the corresponding lane marking taken from a vehicle. The device further comprises means for obtaining 3-D map data, wherein the 3-D map data comprises a plurality of lane boundaries for an area of the road in which the vehicle is located, means for determining a vehicle position estimate based at least in part on the location information, the one or more stripes, and the 3-D map data, and means for providing the vehicle position estimate to a system or device of the vehicle.

An example non-transitory computer-readable medium, according to the disclosure, comprises instructions embedded thereon for associating vehicle lane markings on a road with 3-D map data for vehicle position estimation. The instructions, when executed by one or more processing units, cause the one or more processing units to obtain location information comprising Global Navigation Satellite System (GNSS) information, Visual Inertial Odometery (VIO) information, or both, and obtain one or more stripes, wherein each of the one or more stripes comprises a 2-D representation of a corresponding lane marking on the road, the 2-D representation derived from a camera image of the corresponding lane marking taken from a vehicle. The instructions, when executed by one or more processing units, further cause the one or more processing units to obtain the 3-D map data, wherein the 3-D map data comprises a plurality of lane boundaries for an area of the road in which the vehicle is located, determine a vehicle position estimate based at least in part on the location information, the one or more stripes, and the 3-D map data, and provide the vehicle position estimate to a system or device of the vehicle.

BRIEF DESCRIPTION OF THE DRAWINGS

Aspects of the disclosure are illustrated by way of example.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

As used herein, the term "position estimate" is an estimation of the location of a vehicle within a frame of reference. This can mean, for example, an estimate of vehicle location on a 2-D coordinate frame (e.g., latitude and longitude on a 2-D map, etc.) or within a 3-D coordinate frame (e.g., latitude, longitude, and altitude (LLA) on a 3-D map), and may optionally include orientation information, such as heading. In some embodiments, a position estimate may include an estimate of six degrees of freedom (6 DoF) (also known as "pose"), which includes translation (latitude, longitude, and altitude) and orientation (pitch, roll, and yaw) information.

It can be noted that, although embodiments described herein below are directed toward determining the position of a vehicle, embodiments are not so limited. Alternative embodiments, for example, may be directed toward other mobile devices and/or applications in which position determination is made. A person of ordinary skill in the art will recognize many variations to the embodiments described herein.

As previously noted, a vehicle position estimate having sub-meter accuracy (e.g., decimeter-level accuracy) within a map can be particularly helpful to an ADAS system for various planning and control algorithms for autonomous driving and other functionality. For example, it can enable the ADAS system to know where the vehicle is located within a driving lane on a road.

Figure 1:
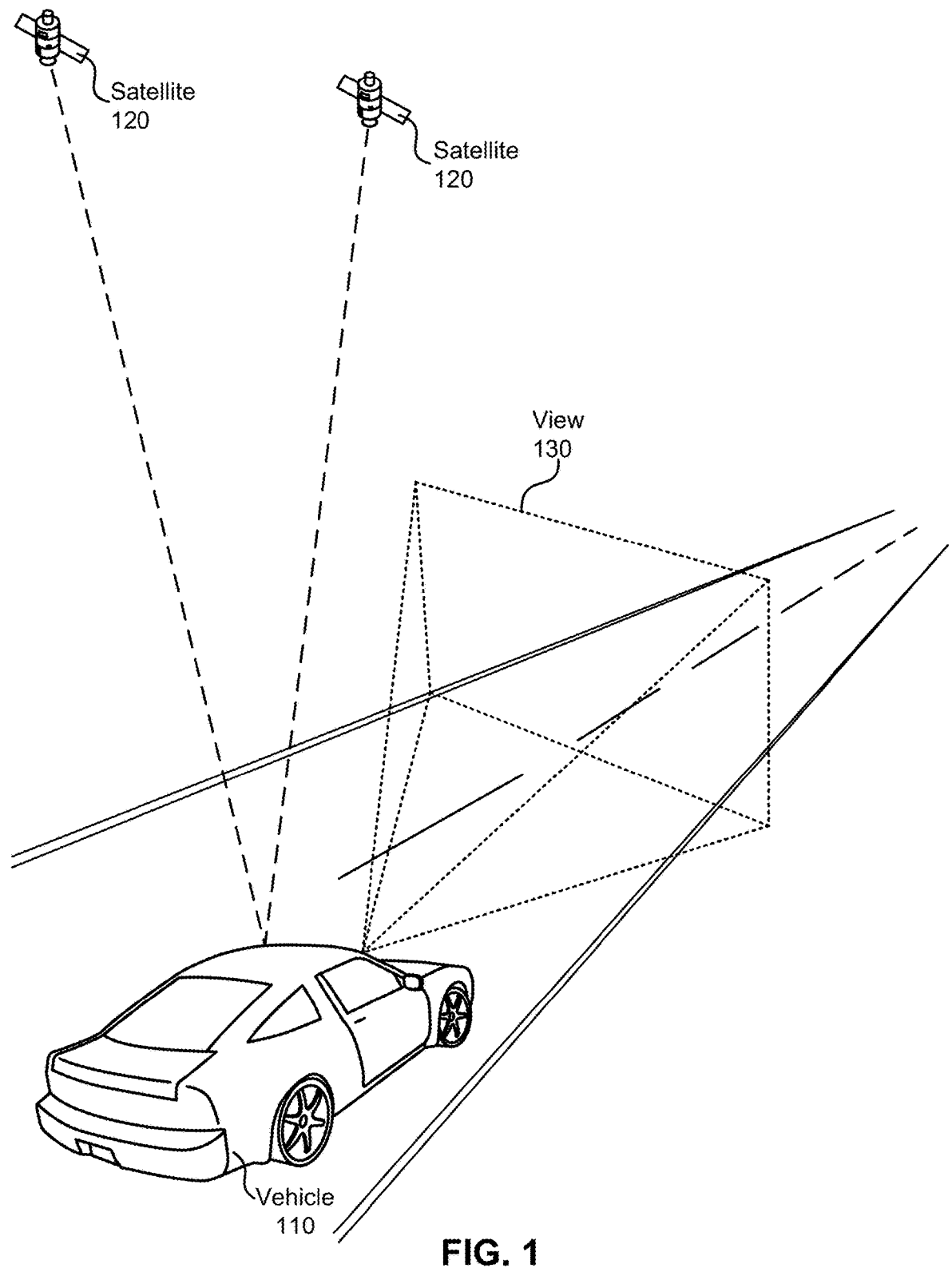
FIG. 1 is a drawing of a perspective view of a vehicle.

FIG. 1 is a drawing of a perspective view of a vehicle 110, illustrating how sub-meter accuracy may be provided to an ADAS system, according to embodiments. Satellites 120 may comprise satellite vehicles of a GNSS system that provide wireless (e.g., radio frequency (RF)) signals to a GNSS receiver on the vehicle 110 for determination of the position (e.g., using absolute or global coordinates) of the vehicle 110. (Of course, although satellites 120 in FIG. 1 are illustrated as relatively close to the vehicle 110 for visual simplicity, it will be understood that satellites 120 will be in orbit around the earth. Moreover, the satellites 120 may be part of a large constellation of satellites of a GNSS system. Additional satellites of such a constellation are not shown in FIG. 1.)

Additionally, one or more cameras may capture images of the vehicle's surroundings. (E.g., a front-facing camera may take images (e.g., video) of a view 130 from the front of the vehicle 110.) Also, one or more motion sensors (e.g., accelerometers, gyroscopes, etc.) disposed on and/or in the vehicle 110 can provide motion data indicative of movement of the vehicle 110. VIO can be used to fuse the image and motion data to provide additional positioning information. This can then be used to increase the accuracy of the position estimate of the GNSS system, or as a substitute for a GNSS position estimate where a GNSS position estimate is not available (e.g., in tunnels, canyons, "urban canyons," etc.).

Figure 2:
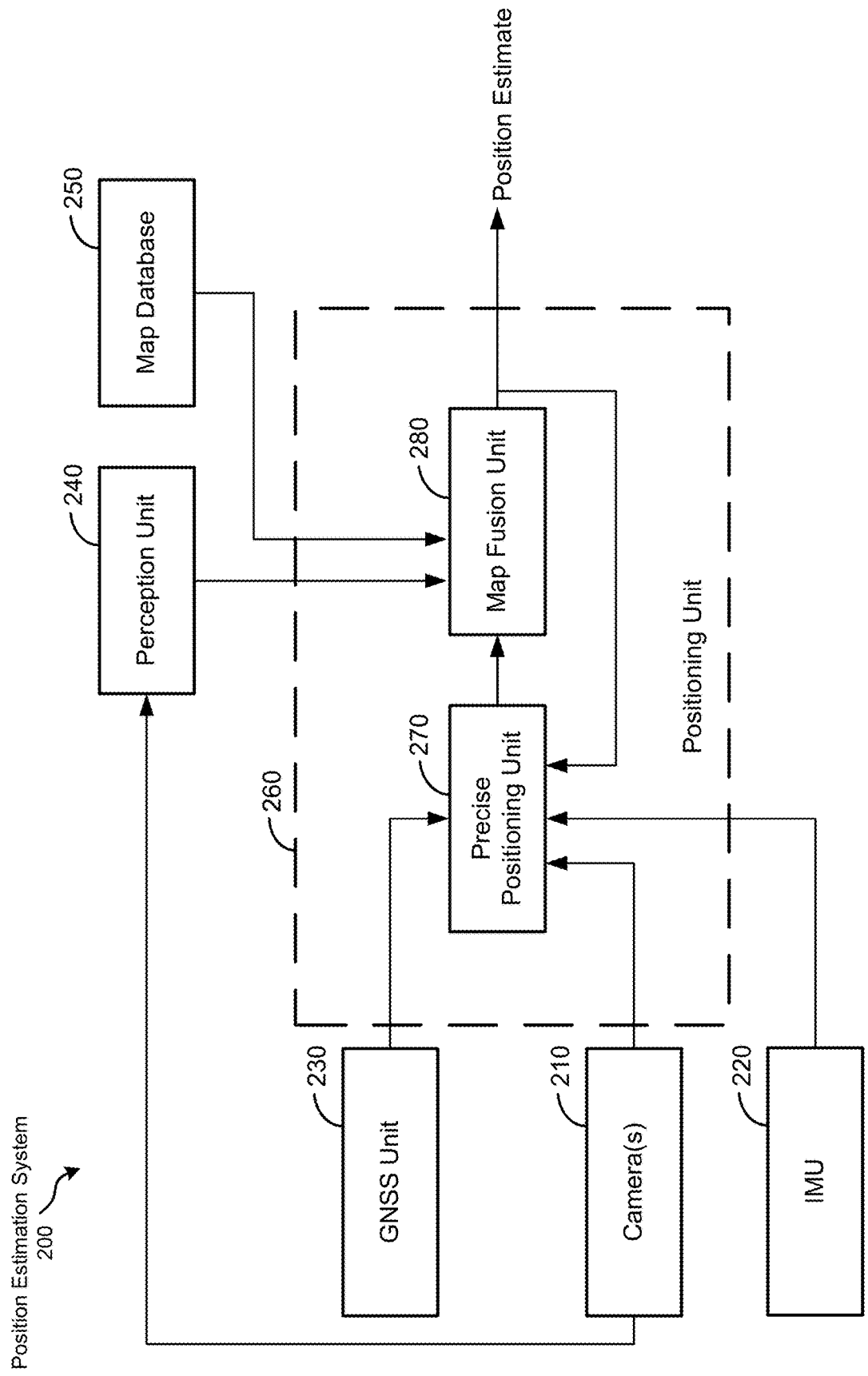
FIG. 2 is a block diagram of a position estimation system 200, according to an embodiment.

FIG. 2 is a block diagram of a position estimation system 200, according to an embodiment. The position estimation system 200 collects data from various different sources and outputs a position estimate of the vehicle, which can be used by an ADAS system and/or other systems on the vehicle, as well as systems (e.g., traffic monitoring systems) remote to the vehicle. The position estimation system 200 comprises one or more cameras 210, an inertial measurement unit (IMU) 220, a GNSS unit 230, a perception unit 240, a map database 250, and a positioning unit 260 comprising a vision-enhanced precise positioning unit 270 and a map fusion unit 280.

A person of ordinary skill in the art will understand that, in alternative embodiments, the components illustrated in FIG. 2 may be combined, separated, omitted, rearranged, and/or otherwise altered, depending on desired functionality. Moreover, in alternative embodiments, position estimation may be determined using additional or alternative data and/or data sources. One or more components of the position estimation system 200 may be implemented in hardware and/or software, such as one or more hardware and/or software components of the mobile computing system 800 illustrated in FIG. 8 and described in more detail below. These various hardware and/or software components may be distributed at various different locations on a vehicle, depending on desired functionality The GNSS unit 230 may comprise a GNSS receiver and GNSS processing circuitry configured to receive signals from GNSS satellites (e.g., satellites 120) and GNSS-based positioning data. The positioning data output by the GNSS unit 230 can vary, depending on desired functionality. In some embodiments, the GNSS unit 230 will provide, among other things, a three-degrees-of-freedom (3-DoF) position determination (e.g., latitude, longitude, and altitude). Additionally or alternatively, the GNSS unit 230 can output the underlying satellite measurements used to make the 3-DoF position determination. Additionally, or alternatively, the GNSS unit can output raw measurements, such as pseudorange and carrier-phase measurements.

The camera(s) 210 may comprise one or more cameras disposed on or in the vehicle, configured to capture images, from the perspective of the vehicle, to help track movement of the vehicle. The camera(s) 210 may be front-facing, upward-facing, backward-facing, downward-facing, and/or otherwise positioned on the vehicle. Other aspects of the camera(s) 210, such as resolution, optical band (e.g., visible light, infrared (IR), etc.), frame rate (e.g., 30 frames per second (FPS)), and the like, may be determined based on desired functionality. Movement of the vehicle 110 may be tracked from images captured by the camera(s) 210 using various image processing techniques to determine motion blur, object tracking, and the like. The raw images and/or information resulting therefrom may be passed to the precise positioning unit 270, which may perform a VIO using the data from both the camera(s) 210 and the IMU 220.

IMU 220 may comprise one or more accelerometers, gyroscopes, and (optionally) other sensors, such as magnetometers, to provide inertial measurements. Similar to the camera(s) 210, the output of the IMU 220 to the precise positioning unit 270 may vary, depending on desired functionality. In some embodiments, the output of the IMU 220 may comprise information indicative of a 3-DoF position or 6 DoF pose of the vehicle 110, and/or a 6 DoF linear and angular velocities of the vehicle 110, and may be provided periodically, based on a schedule, and/or in response to a triggering event. The position information may be relative to an initial or reference position. Alternatively, the IMU 220 may provide raw sensor measurements.

The precise positioning unit 270 may comprise a module (implemented in software and/or hardware) configured to perform of VIO by combining data received from the camera(s) 210 and IMU 220. For example, the data received may be given different weights based on input type, a confidence metric (or other indication of the reliability of the input), and the like. VIO may produce an estimate of 3-DoF position and/or 6 DoF pose based on received inputs. This estimated position may be relative to an initial or reference position.

The precise positioning unit 270 can then combine the VIO position estimate with information from the GNSS unit 230 to provide a highly-accurate vehicle position estimate in a global frame to the map fusion unit 280. The map fusion unit 280 works to provide a vehicle position estimate within a map frame, based on the position estimate from the precise positioning unit 270, as well as information from a map database 250 and a perception unit 240. The map database 250 can provide a 3-D map (e.g., a high definition (HD) map) of an area in which the vehicle 110 is located, and the perception unit 240 can make observations of lane markings, traffic signs, and/or other visual features in the vehicle's surroundings. To do so, the perception unit 240 may comprise a feature-extraction engine that performs image processing and computer vision on images received from the camera(s) 210.

According to embodiments, the map data received from the map database 250 may be limited to conserve processing and storage requirements. For example, map data provided from the map database 250 to the map fusion unit 280 may be limited to locations within a certain distance around the estimated position of the vehicle 110, locations within a certain distance in front of the estimated position of the vehicle 110, locations estimated to be within a field of view of a camera, or any combination thereof.

The position estimate provided by the map fusion unit 280 (i.e., the output of the positioning unit 260) may serve any of a variety of functions, depending on desired functionality. For example, it may be provided to ADAS or other systems of the vehicle 110 (and may be conveyed via a controller area network (CAN) bus, communicated to devices separate from the vehicle 110 (including other vehicles; servers maintained by government agencies, service providers, and the like; etc.), shown on a display of the vehicle (e.g., to a driver or other user for navigation or other purposes), and the like.

Figure 3A:
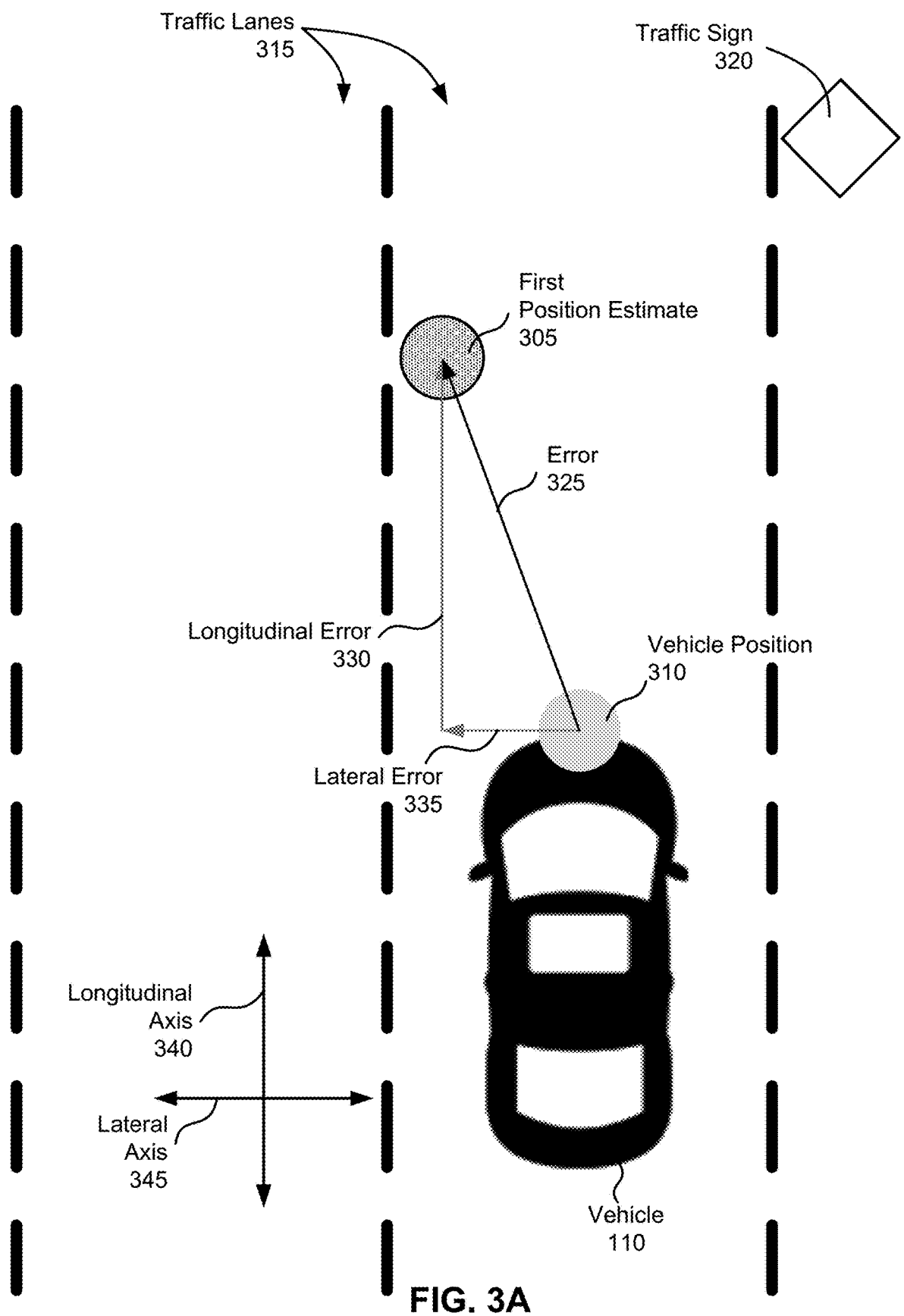
FIGS. 3A-3C are overhead views a vehicle, illustrating how error correction can improve position estimates, according to an embodiment.
Figure 3B:
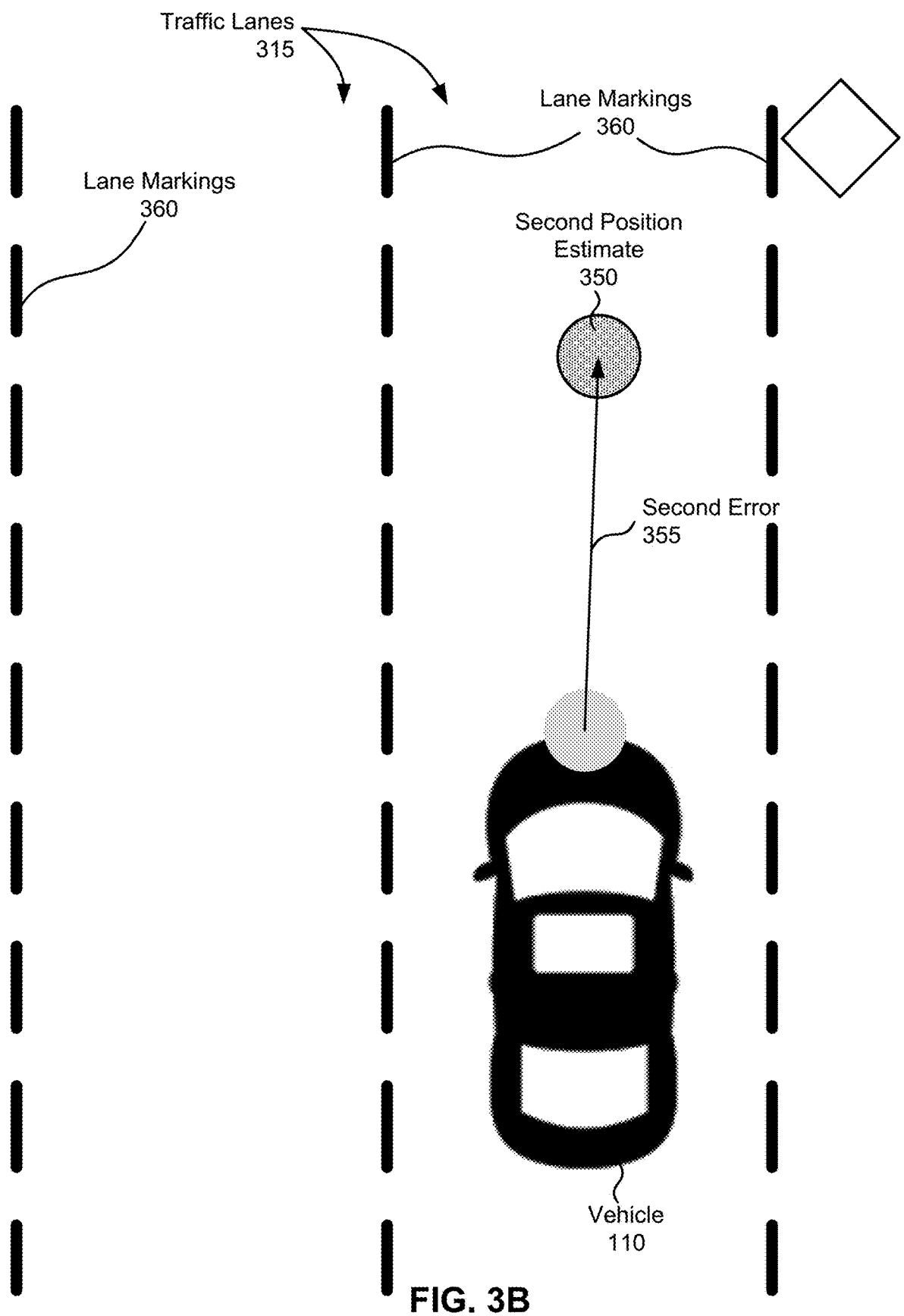
Figure 3C:
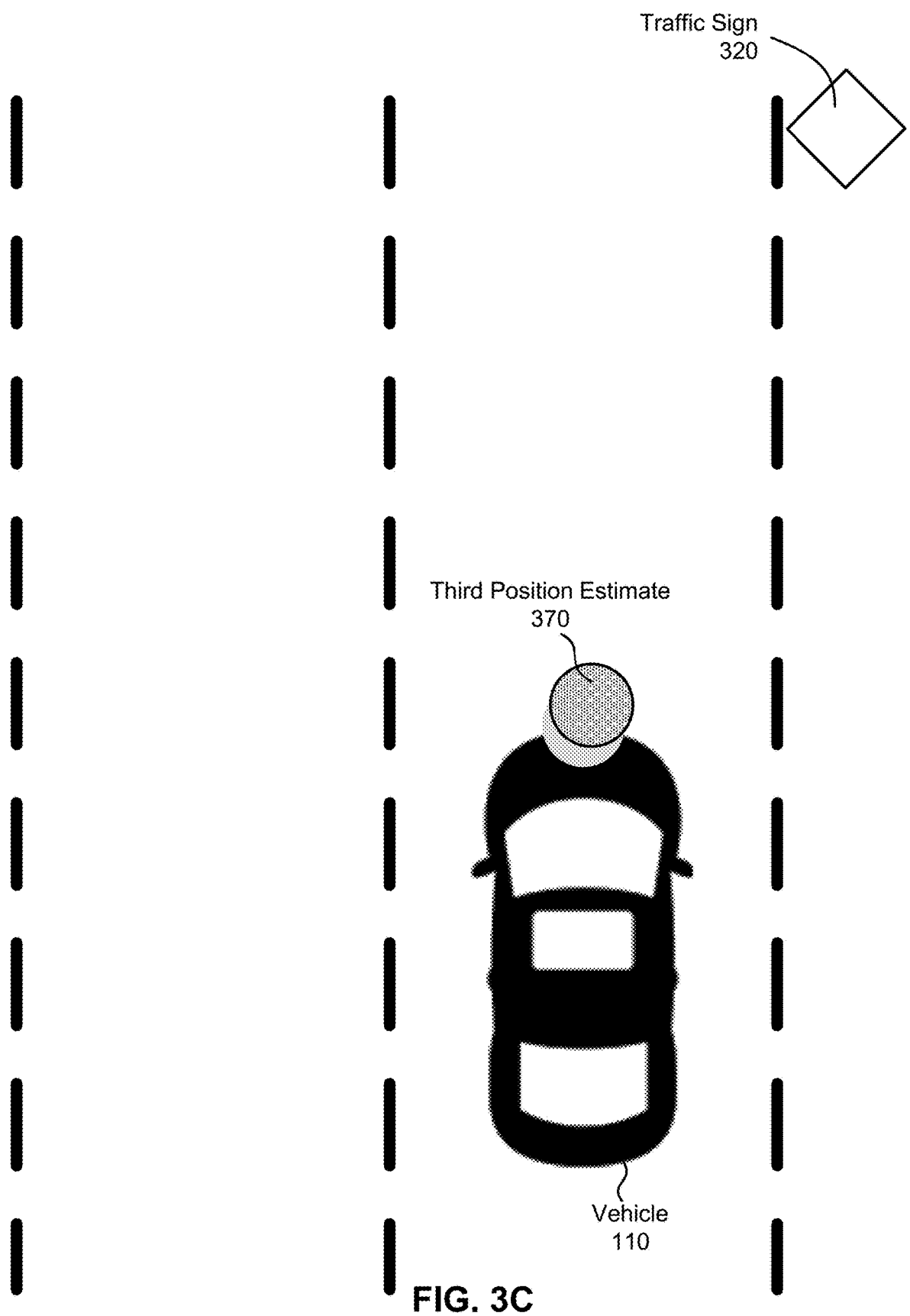

FIGS. 3A-3C are overhead views a vehicle 110, illustrating an first position estimate 305 for a vehicle 110, and how error correction can improve the position estimate. Here, the first position estimate 305 and subsequent position estimates are intended to estimate a vehicle position 310 located at the front of the vehicle 110. (It can be noted that, alternative embodiments may use a different convention for where the vehicle position 310, is located on the vehicle 110.)

FIG. 3A illustrates the vehicle 110 driving in the right-hand lane of a road with two traffic lanes 315 and a nearby traffic sign 315. The first position estimate 305 is the position estimate provided by the precise positioning unit 270 to the map fusion unit 280, and thereby may be based on GNSS and/or VIO position estimates.

As can be seen, the first position estimate 305 does not truly reflect the vehicle position 310. The distance between the first position estimate 305 and the vehicle position 310 is the error 325 in the position estimate. Error 325 can be broken down into longitudinal error 330 and lateral error 335.

As previously noted, "longitudinal" and "lateral" directions may be based on a coordinate system that has a longitudinal axis 340 in the direction of the lane 315 in which the vehicle 110 is located, and a lateral axis 345 perpendicular to the longitudinal axis 340, where both axes are in the plane of the surface on which the vehicle 110 is located. Alternatively, longitudinal and lateral directions may be based on the vehicle's heading. (Under most circumstances, the direction of the lane 315 is substantially the same direction of the vehicle's heading.) Other embodiments may determine longitudinal and lateral directions in other ways.

FIG. 3B illustrates an second position estimate 350 that can be the result of lateral error correction that can reduce or eliminate lateral error 335 (FIG. 3A), of the first position estimate 305 according to embodiments. As such, the second error 355 for the second position estimate 350 may have little or no lateral error. Lateral error correction can be based on the traffic sign 320 and/or lane markings 360 near the vehicle 110, for example. Because lane markings 360 are disposed laterally across the field of view of a camera located on the vehicle, they can be particularly useful in lateral error correction. (Although illustrated as dashed lines, various types of lane markings 360 can be identified and used for error correction, including bumps, dots, and/or solid lines.)

FIG. 3C illustrates a third position estimate 370 that can be the result of both latitudinal and longitudinal error correction, according to embodiments. Longitudinal error correction also can be based on the traffic sign 320 and/or lane markings 360 near the vehicle 110. Because the traffic sign 320 offers depth information, it can be particularly useful in longitudinal error correction.

To provide lateral and/or longitudinal error correction using lane boundaries, the map fusion unit 280 (shown in FIG. 2) can perform "lane association" to associate observations of lane markings 360 from perception with lane boundaries located in a 3-D map of the area in which the vehicle 110 is located, retrieved from the map database 250. More specifically, lane markings 360 are captured in an image and identified by the perception unit 240. The perception unit 240 then provides observations of these identified lane markings 360, known as "stripes" to the map fusion unit 280, which then associates the stripes with corresponding lane boundaries in the 3-D map. Using the difference (e.g., distance) between a stripe and its associated lane boundary in the 3-D map, the map fusion unit 280 can correct for lateral error 335 using standard filtering techniques such as an extended Kalman filter (EKF). Thus, a correct lane association can help increase the positioning accuracy of the second position estimate 350 (FIG. 3B) provided by the map fusion unit 280, while incorrect associations could introduce additional positioning error.

It can be noted that the process illustrated in FIGS. 3A-3C is provided as an example of how error correction of a first position estimate 305 may be made. Alternative embodiments may perform error correction differently. In some embodiments, for example, an initial position estimate may include some form of error correction (e.g., lateral and/or longitudinal error correction). Moreover, alternative embodiments may implement the error correction process differently. For example, in some embodiments, correction of longitudinal error 330 and lateral error 335 (FIG. 3A), may be done in a single step, rather than separately. That is, some embodiments may perform error correction by performing error correction on the first position estimate 305 that results in third position estimate 370, but without an intermediate second position estimate 350 (or similar correction of longitudinal error).

FIGS. 4A-4D are visual representations of data used by the map fusion unit 280 to perform lane association, according to some embodiments.

Figure 4A:
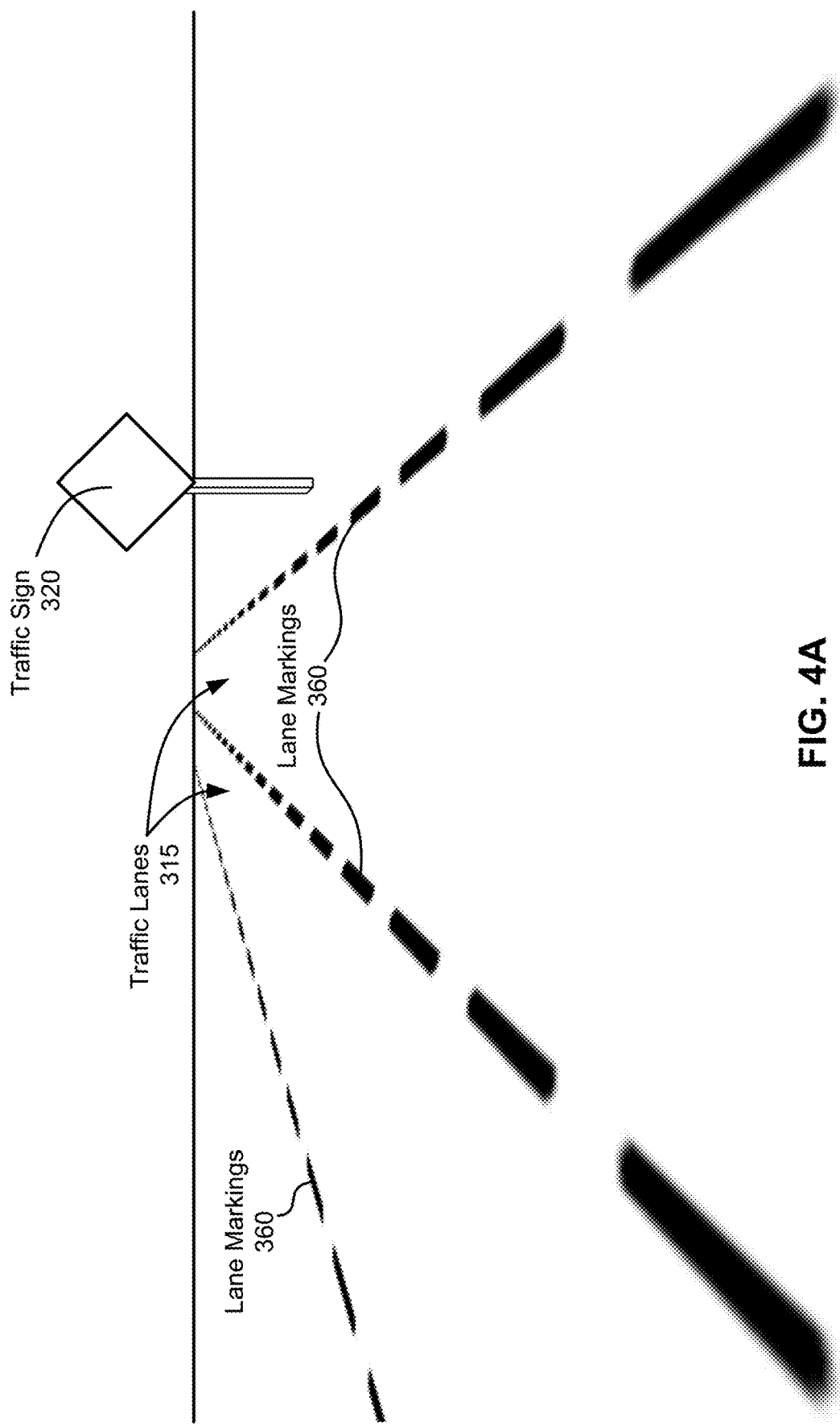
FIGS. 4A-4D are visual representations of data used to perform lane association, according to some embodiments.

FIG. 4A is an illustration of an image captured by a front-facing camera of the vehicle 110. The image includes lane markings 360, traffic lanes 315, and traffic sign 320 corresponding to those found in FIGS. 3A-3C.

Figure 4B:
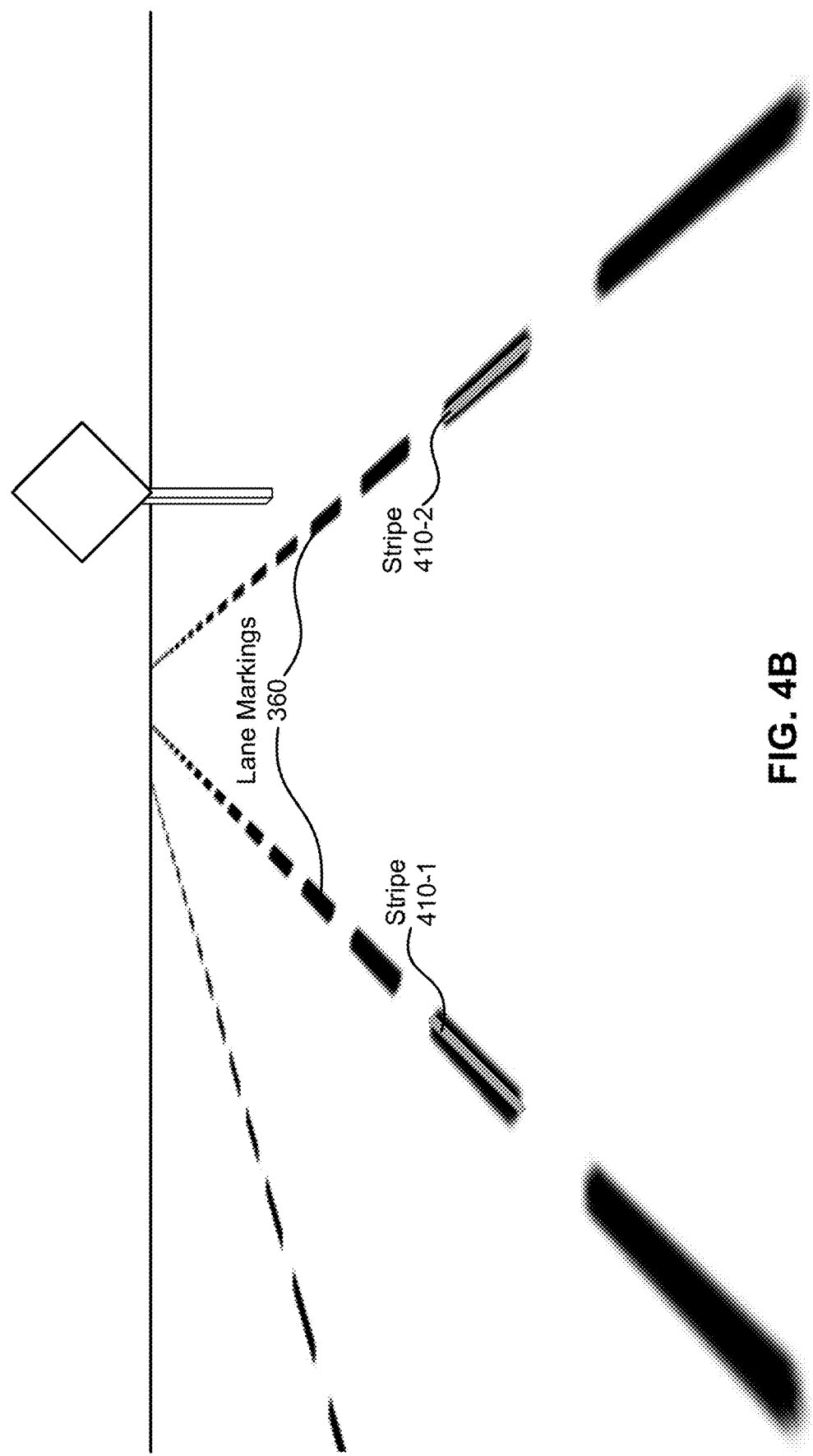

FIG. 4B is an illustration of how portions of the lane markings 360 may be identified by the perception unit 240 as stripes 410. As previously indicated, the perception unit 240, which processes the camera image, may generate stripes 410-1 and 410-2 (collectively and generically referred to herein as stripes 410) to indicate where the lane boundaries are, based on observations of lane markings 360. The perception unit 240 can then provide the stripes 410 to the map fusion unit 280 for further processing. (It can be noted that, although two stripes are illustrated in FIG. 4B, the perception unit 240 can identify any number of stripes 410 from visual markings.)

Depending on desired functionality, only a portion of the lane markings 360 may be identified as stripes 410. For example, the perception unit 240 may identify stripes 410 from portions of lane markings 360 at or within a threshold distance. Although illustrated in FIG. 4B as lines, stripes 410 may be represented as a set of points within a 2-D image (e.g., endpoints that may, in some cases, have one or more points therebetween), and the perception unit 240 may indicate that each of the points belong to a single stripe 410 (identifying a single lane marking 360). Furthermore, identifying only a portion of the lane markings 360 as stripes 410 can help reduce the amount of any curvature in stripes, which, among other things, can help make distance determination simpler. That said, in alternative embodiments, stripes may comprise different data indicative of the location of lane markings 360 within a 2-D image.

Figure 4C:
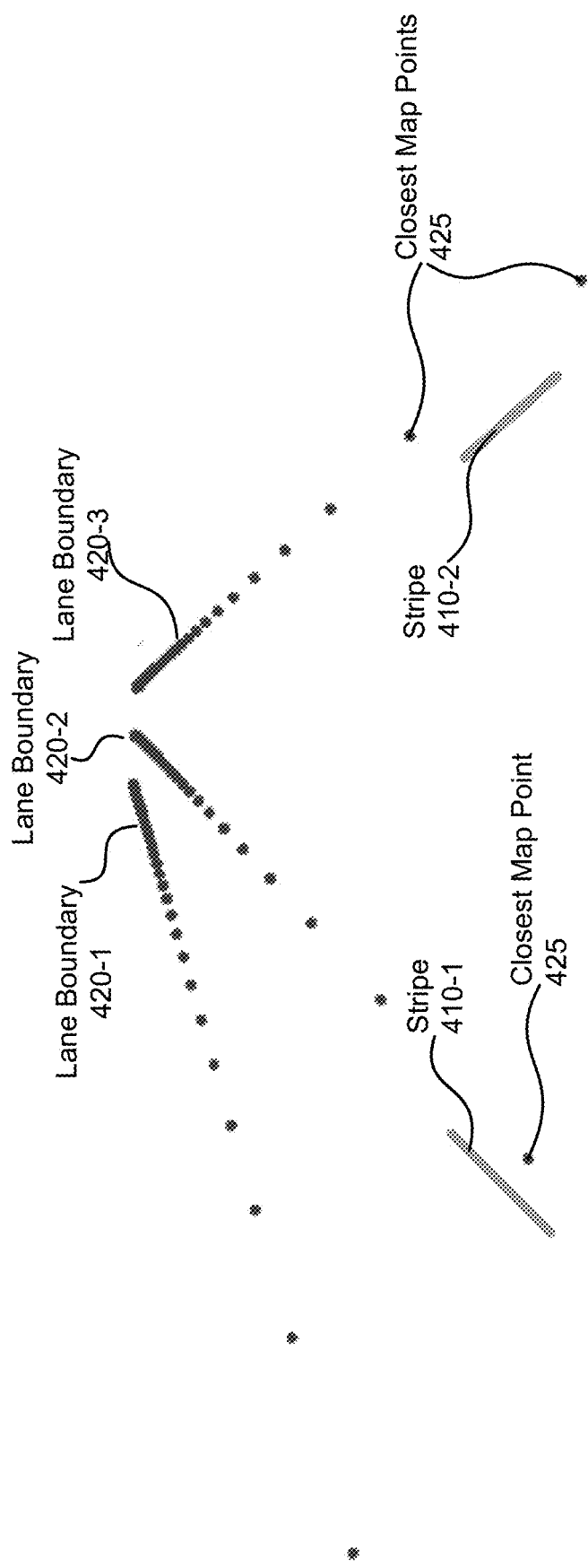

FIG. 4C is an illustration of how stripes 410 may be associated with lane boundaries 420 within the map data. Here, lane boundaries 420-1, 420-2, and 420-3 (collectively and generically referred to herein as lane boundaries 420) illustrate map data. As can be seen, each lane boundary 420 is represented by a set of points, where each point represents a location in 3-D space, and each point is associated with a respective lane boundary. Assuming perfect position estimate and map data (i.e., no position estimation error or map error), the lane boundaries 420 and observations of lane markings 360 (i.e., stripes 410) should overlap (in the same manner stripes 410 overlapped with lane markings 360 in FIG. 4B). Thus, any offset represents error between the current position estimate of the map fusion unit 280 and vehicle position 310.

Lane association is the process of associating stripes 410 (derived from an image of the vehicle surroundings) with a lane boundary 420 of the map. According to embodiments, the process of lane association can include projecting stripes 410 from a 2-D image frame to a 3-D map frame (e.g., an "East North Up"(ENU) frame), associating each stripe 410 with a lane boundary having the smallest 3-D distance therewith, and applying testing criteria to reject associations that may be incorrect (which could lead to poor error correction).

Projecting stripes 410 onto a 3-D map frame can facilitate lane association by using actual distances and angles between stripes and lane markings for the subsequent 3-D distance comparison and testing. More specifically, due to the lack of depth information, two objects being close to each other in 2-D image does not necessarily imply that they are actually close in the 3-D space. Thus, searching for associations in 2-D image based on pixel distances can result in additional errors.

According to embodiments, 2-D stripe points observed by the camera to the 3-D map ENU frame, while the lane markings from the map are already in 3-D. The projection from 2-D to 3-D is based on the following relationship $$[x_o \ y_o]^T = \left[\frac{x_I}{z_I} \ \frac{y_I}{z_I}\right]^T \tag{1}$$

where $[x_o \ y_o]^T$ is a stripe point in the 2-D image frame, and $x_I$, $y_I$, and $z_I$ are given by:

$$[x_I y_I z_I]^T = KR_{nc}^T([x_n y_n z_n]^T - T_{nc}) \tag{2}$$

in which K is known camera intrinsic matrix, $R_{nc}$ and $T_{nc}$ are estimates for the camera's rotation matrix and 3-D position by the map fusion unit 280, and $[x_n \ y_n \ z_n]^T$ is the 3-D projection of the stripe point $[x_o \ y_o]^T$, which is to be solved for.

According to embodiments, the plane equation can be used to solve for $[x_n \ y_n \ z_n]^T$ from $[x_o \ y_o]^T$. In particular, based on the current position estimate of the map fusion unit 280 for the vehicle within the 3-D map frame, the three closest map points can be identified (e.g., closest map points 425 illustrated in FIG. 4C). These closest points can then be used to determine a plane on which the vehicle 110 and the nearby lane markings 360 are located. The obtained plane is characterized by the following plane equation:

$$a_n x + b_n y + c_n z + d_n = 0 \tag{3}$$

where $a_n$, $b_n$, $c_n$ and $d_n$ are coefficients of the plane equation that are calculated based on the coordinates of the three map points. By using the above plane equation together with the relationship in equation (2), a new plane equation that contains $[x_I \ y_I \ z_I]^T$ can be obtained, given by:

$$a_I x + b_I y + c_I z + d_I = 0 \tag{4}$$

where $[a_n \ b_n \ c_n] = [a_I \ b_I \ c_I](KR_{nc}^T)^{-1}$ and $d_I = d + [a_n \ b_n \ c_n]T_{nc}$.

Furthermore, from equation (1), $x_I$ and $y_I$ can be expressed as $x_I = x_o z_I$ and $y_I = y_o z_I$. Then since $[x_I\ y_I\ z_I]^T$ is contained in the plane characterized by equation (4), the following equation can be derived:

$$a_p x_I + b_p y_I + c_p z_I + d_p = a_p x_o z_I + b_p y_o z_I + c_p z_I + d_p = 0. \qquad (5)$$

From equation (5), $z_I$ can be obtained. The terms $x_I$ and $y_I$ can then be obtained. Finally, using the relationship in equation (2), $[x_n\ y_n\ z_n]^T$ can be obtained as follows:

$$[x_n y_n z_n]^T = (K R_{nc}^T)^{-1} [x_I y_I z_I]^T + T_{nc} \qquad (6)$$

In this way, observed stripes 410 from a 2-D image frame can be projected onto the 3-D map frame.

Figure 4D:
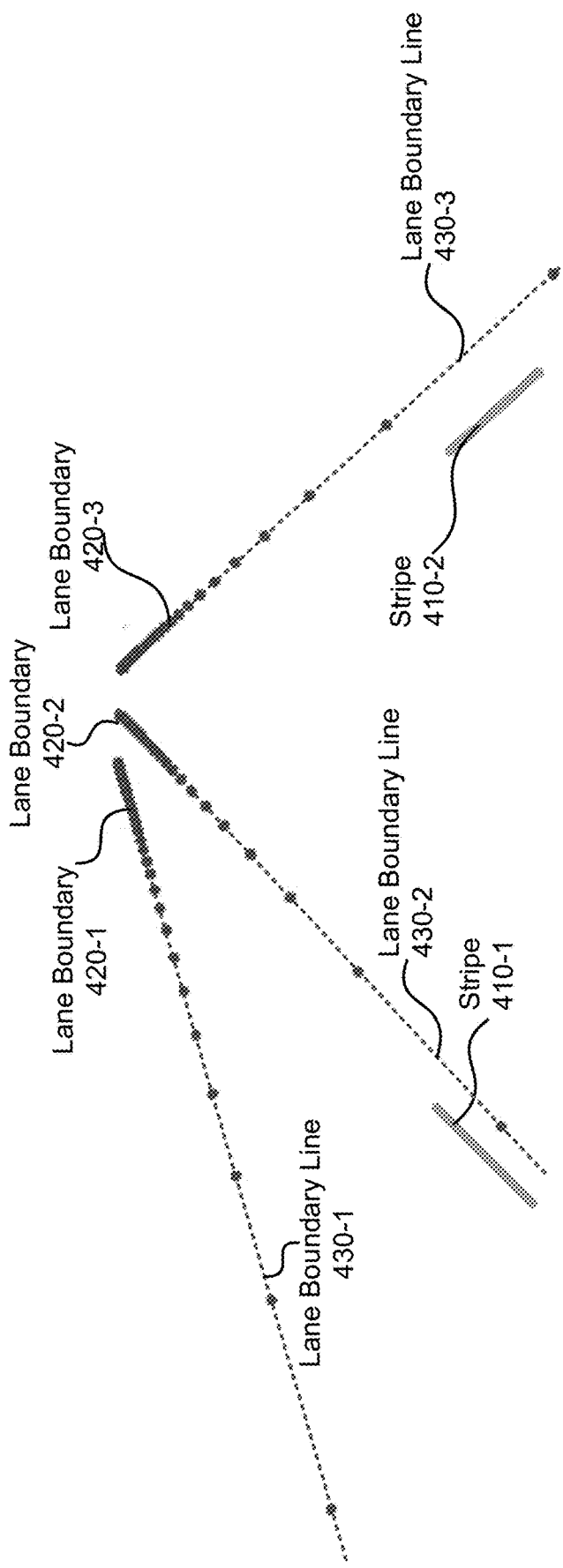

As noted above, once each stripe 410 is projected onto the plane in the 3-D map frame, each stripe 410 can then be associated with a respective lane boundary 420 having the smallest 3-D distance. FIG. 4D is a figure provided to help illustrate this process can be done, according to an embodiment. Here, the distance between a stripe and a lane boundary 420 is calculated by first selecting two points (e.g., end points, or one point closest to the camera and the other being the middle point of the stripe) to represent a stripe 410, calculating the two point-to-line distances of the two selected stripe points towards a lane boundary line 430 (FIG. 4O) representative of the corresponding lane boundary 420. Finally, the distance between the stripe 410 and the lane boundary line 430 may be determined as the average of the two point-to-line distances. That said, alternative embodiments may use different ways of determining a distance from a stripe 410 to a lane boundary line 430.

For each stripe 410, a distance between the respective stripe 410 and lane boundary lines 430 for all lane boundaries 420 is determined, and the respective stripe 410 is associated with the lane boundary 420 corresponding to the lane boundary line 430 with the smallest distance to the respective stripe 410. Alternative embodiments may use different ways of determining the associations between stripes and lane boundaries based on 3-D distances, for example, by jointly considering the 3-D distances of all stripes and lane boundaries, and by taking into account the geometrical relationship among stripes and lane boundaries, as well as attribute information such as color and boundary type.

According to some embodiments, optimizations can be made to reduce the computational complexity. For example, the 2-D image may be used as a reference for the search for optimizations based on relative lateral position. In particular, the relative position stripes 410 can be determined from left to right on the 2-D image. (E.g., stripe 410-1 can be determined to be left of stripe 410-2.) The relative position of lane boundaries 420 from left to right can be similarly determined. This can allow for optimization by forgoing distance determinations where necessary. For example, once the left-most stripe 410-1 is associated with a first lane boundary 420-2, the process can forgo determining whether to associate the subsequent stripe 410-2 (or any other stripes located to the right of the left-most stripe 410-1) with any lane boundary (e.g., lane boundary 420-1) to the left of the first lane boundary 420-2.

Put generically, if the kth stripe (from the left) is already associated to the jth lane boundary, then for the (k+1)th stripe, we will search from the jth lane marking instead of from the first lane boundary. This is because the (k+1)th stripe is to the right of the kth stripe on the 2-D image, the 1st, 2nd, ..., (j+1)th lane boundary are to the left of the jth lane boundary. Since the kth stripe is already associated to the jth lane marking, it is impossible for the kth stripe to be associated to any of the 1st, 2nd, ..., (j+1) th lane boundary. In this way, the number of searches and hence the overall computational complexity can be reduced.

Once each of the stripes 410 has been associated with a respective lane boundary 420 based on distance, certain criteria may be tested to determine whether or not to reject the association. In particular, each association may be scrutinized to determine whether the association is potentially incorrect (which could result in inaccurate error correction). The criteria used can vary, depending on desired functionality. As a first example, the distance between the stripe 410 and the associated lane boundary 420 can be analyzed to see if the distance is below a threshold distance. That is, if the distance is greater than the special distance, then the association could be considered as invalid (and thus, not used in subsequent error correction). The threshold distance can vary, based on any of a variety of considerations, including physical characteristics of road conditions. For example, in some embodiments, the threshold distance (e.g. may be 1.5 m) based on the typical lane width of 3.5 m and a desire to determine where, within a lane, the vehicle is located. Other embodiments may have a threshold distance greater or less than 1.5 m.

And other example criterion that can be tested is if the angle between a stripe 410 and the lane boundary 420 which it is associated is greater than a threshold angle. If so, the association is considered as invalid. According to some embodiments, this threshold angle can be 10°, although other embodiments may have a threshold angle that is greater than or less than 10°. The reasoning behind this criterion is that that a stripe 410 should be roughly parallel to its associated lane boundary 420. Angles can be determine any of a variety of ways. For example, endpoints of the stripe 410 can be used to determine angle of the stripe. And two nearby points of the lane boundary 420 can be used to determine the angle of the stripe. Where the direction vectors of the stripe 410 and lane boundary 420 are $u_s$ and $u_m$, respectively, the threshold angle criterion can be determined as follows:

$$u_s^T u_m < \cos(10 \text{ deg}) \qquad (7)$$

According to other embodiments, another criterion is whether there is another lane boundary 420 near the lane boundary 420 which the stripe 410 is associated. That is, if there exists another lane boundary 420 that is within a threshold proximity of the associated lane boundary 420, then the association of the stripe 410 to the associated lane boundary 420 can be considered invalid. This testing criterion can be used to deal with scenarios with two lane markings that are very close to each other, in which case it is less certain which of the two lane boundaries 420 the stripe 410 should be associated with. Again, a misassociation can introduce an additional lateral positioning error, so a conservative approach would be to consider the association invalid. (It can be noted that, visual lane marking 360 on the road can delineate boundaries in different ways, but the proximity of boundaries as determined by this testing criterion is dependent on the map. That is, although visual lane markings 360 may indicate a boundary with two parallel lines, the maps may have a single corresponding lane boundary 420. The perception unit 240 may identify a visual lane marking 360 in an image with double lines as a single stripe 410.)

Once stripes 410 are associated with respective lane boundaries 420, a Kalman filter and/or other error correction algorithms can be used to reduce or eliminate lateral error 335 based on the difference in location of the stripes 410 with the respective lane boundaries 420. That said, it can be noted that embodiments are not limited to using lane association for lateral error correction only. Alternative embodiments may perform longitudinal and/or other error correction for the position estimate based on lane association (where observed stripes 410 are capable of providing longitudinal and/or other error correction information).

Figure 5:
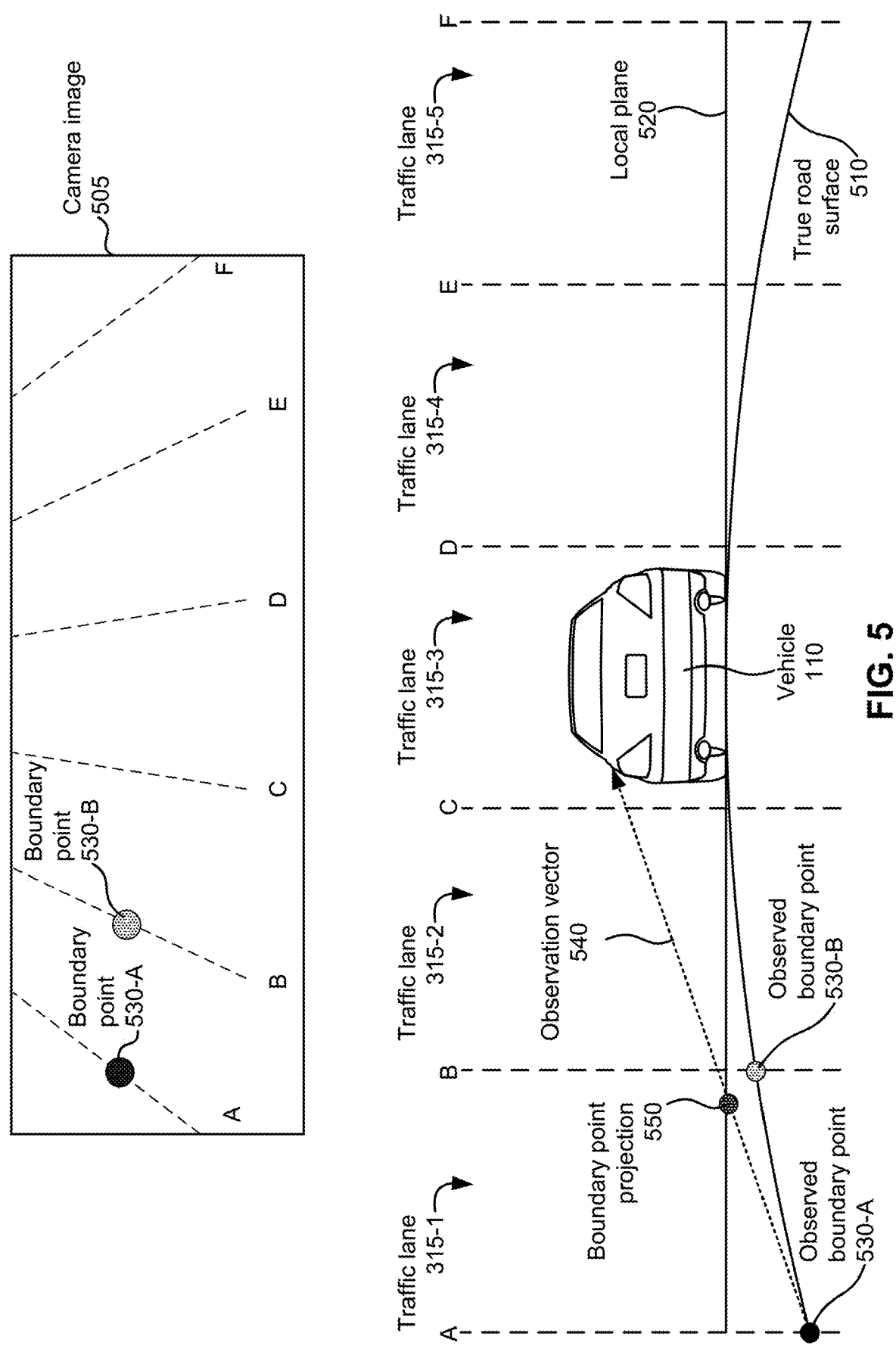
FIG. 5 is a diagram illustrating an embodiment that takes into account issues arising from road curvature.

FIG. 5 is a diagram illustrating an embodiment that further takes into account issues arising from curvature in the road. Here, the diagram shows a rear view of the vehicle 110 on a road. Camera image 505 is a 2-D image taken from the vehicle 110 (e.g., from a front-facing or rear-facing camera) of the portion of the road on which the vehicle 110 is located, and may represent a composite image created from multiple images taken by multiple cameras on the vehicle 110. Additional details regarding the camera image 505 are provided below.

The profile of the road is shown by the true road surface 510. The local plane 520 is the plane on which the vehicle 110 is located, which can be calculated by the vehicle 110 based on sensor input indicating orientation of the vehicle 110. Representation of lane boundaries (labeled A-F) and corresponding traffic lanes 315 are shown vertically in FIG. 5 for ease of reference. (Of course, actual lane boundaries would be located on the road.) As can be seen, there is a divergence between the local plane 520 and the true road surface 510, which gets more extreme with further distance from the vehicle 110. This may cause problems when associating lane markings to 3-D map data for lane boundaries that are farther away from the vehicle 110. (That is, these issues may not arise for lane markings for the traffic lane 315-3 in which the vehicle 110 is located (e.g., lane markings for lane boundaries C and D). However, these errors can be substantial for lane boundaries of other lanes (e.g., lane markings A, B, E, and F).)

For example, observed boundary points 530-A and 530-B (generically and collectively referred to herein as observed boundary points 530) represent points on lane markings (e.g., stripes) for respective lane boundaries A and B of the road, captured by a camera on the vehicle 110 and observable in camera image 505, as shown. The observation vector 540 represents a vector extending from a first boundary point 530-A to the camera plane of the camera (not shown) capturing the camera image 505. Thus, the boundary point projection 550 represents a projection of the first boundary point 530-A, as captured in the camera image 505, onto the local plane 520. As can be seen, however, the location of the boundary point projection 550 ends up being relatively distant from the first boundary point 530-A. This can be problematic for techniques that (as provided in the embodiments described above) further project the first boundary point projection 550 onto a map plane (not shown) derived from nearby points in the 3-D map data. Here (assuming the observed boundary point 530-B is near the lane boundaries in the 3-D map data), the lane boundary in the 3-D map data that is closest to the first boundary point projection 550 would be boundary point from boundary B, the map plane onto which the first boundary point projection 550 would be further projected would be a plain tangent to the true road surface 510 at second boundary point 530-B. This can ultimately cause problems in lane association where the observed boundary point 530-A may be associated with lane boundary B in the 3-D map data.

Figure 6:
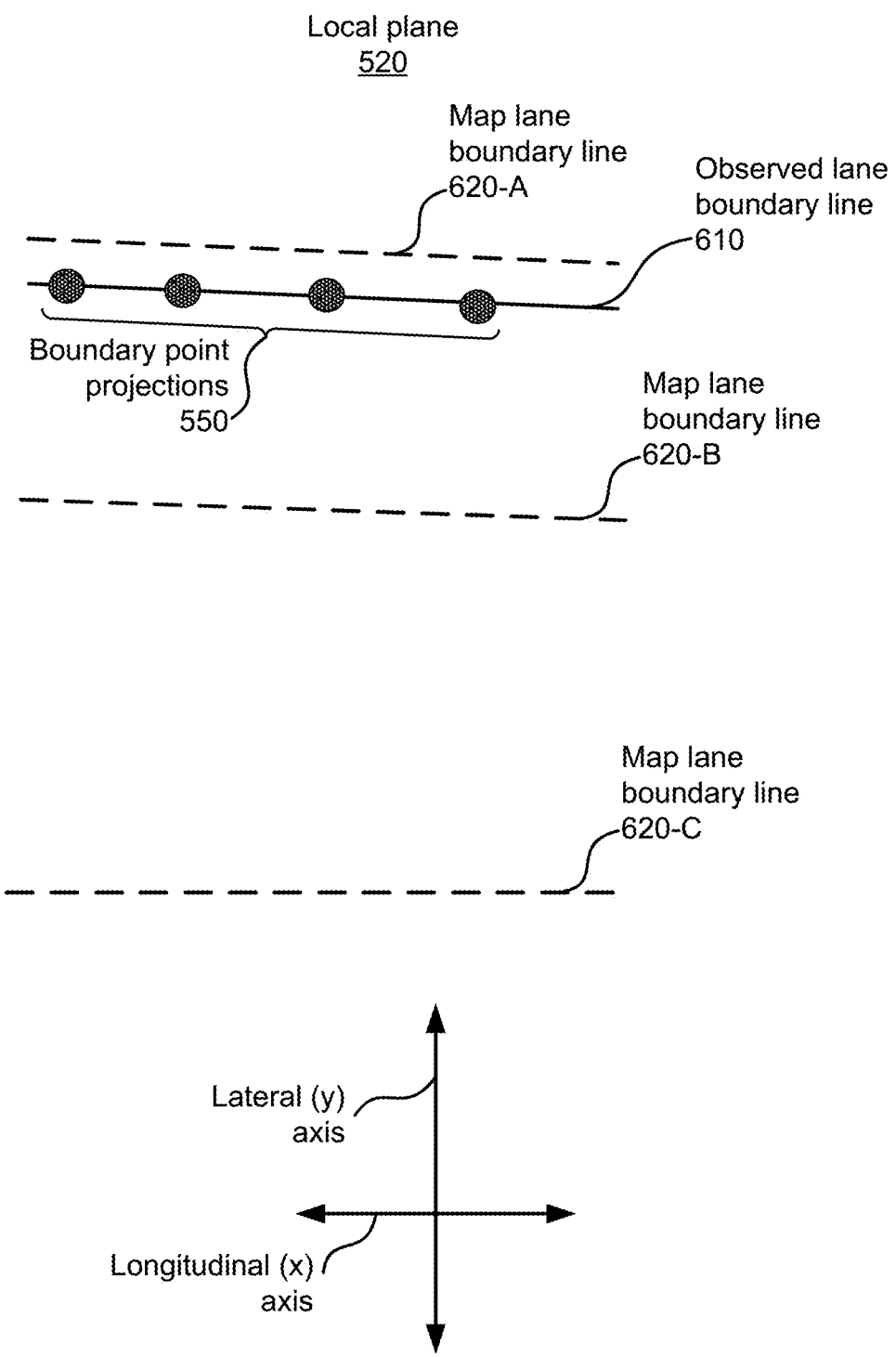
FIG. 6 is an example overhead view of the local plane of FIG. 5 showing projected lines for observed and 3-D map boundary points can be compared for lane association, according to some embodiments.

With this in mind, some embodiments may avoid such errors by projecting lane boundaries in the 3-D map data onto the local plane 520 using observation vectors (similar to the observation vector 540 shown in FIG. 5), then comparing a line equation of an observed boundary line (e.g., stripe), as projected on the local plane 520, with line equations of projected map data. FIG. 6 and the description below helps illustrate an embodiment in more detail.

FIG. 6 is an example overhead view of the local plane 520 of FIG. 5, provided to help show how projected lines for observed and 3-D map boundary points can be compared for lane association, according to some embodiments. Here, the boundary point projections 550 may be derived from observed boundary points and projected onto the local plane 520 using respective observation vectors, as previously described with regard to FIG. 5.

In some embodiments, the measurement model for boundary points $v_i$ in the image is as follows:

$$v_i = f(v_k) = f(KR_{cb}R_{bn}(v_n - T_{nc})), \quad (8)$$

in which, like equation (2) above, K is the camera intrinsic matrix, $R_{cb}R_{bn}$ and $T_{nc}$ are estimates for the camera's rotation matrix and 3-D position by the map fusion unit 280. Given body frame "b" (also referred to herein as b-frame), rotation from ENU to camera frame $R_{cn}$ can be decomposed into two parts $R_{cb}$ and $R_{bn}$ such that $R_{cn} = R_{cb}R_{bn}$, where $R_{cb}$ is rotation from body frame to camera frame, and $R_{bn}$ is rotation from ENU frame to body frame.

For points in a b-frame $v_b = (x_b, y_b, z_b)$, the local plane 520 can be defined as satisfying the plane equation:

$$ax_b + by_b + cz_b + d = 0. \quad (9)$$

Further, image point depth $z_k$ (the distance from the image plane to the local plane point) can be defined by:

$$z_k = \frac{-d}{[a, b, c](KR_{cb})^{-1}\begin{bmatrix} v_i \\ 1 \end{bmatrix}}. \quad (10)$$

Mapping image points $v_i$ to local plane points $v_b$ (e.g., creating boundary point projections 550), then, can be done using the following equation:

$$v_b = (KR_{cb})^{-1}\begin{bmatrix} v_i \\ 1 \end{bmatrix} z_k. \quad (11)$$

Points in the 3-D map data, $v_n$, can be similarly mapped to local plane points $v_b$:

$$v_b = R_{nc}^T v_c \frac{z_k}{v_c(3)}, \quad (12)$$

where $$v_c = R_{cb}R_{bn}(v_n - T_{nc}) \quad (13)$$

Resulting projected points can then be used to determine lines in the local plane for comparison. As previously discussed, an observed lane boundary line 610 can be determined in the local plane 520 by performing a line fitting of the boundary point projections 550. A line equation can then be determined for the observed lane boundary line 610 as follows:

$$y_{LAT} = SLOPE_i x_{LON} + INTERCEPT_i, \quad (14)$$

where $x_{LON}$ is longitudinal axis and $y_{LAT}$ is lateral axis.

Similarly, map lane boundary lines 620-A, 620-B, and 620-C (corresponding to respective lane boundaries A, B, and C in FIG. 5) can be determined in a similar manner from points in the 3-D map data (not shown) projected onto the local plane using equation (12). A line equation can then be determined for each map lane boundary line 620 as follows:

$$y_{LAT} = \text{SLOPE}_m x_{LON} + \text{INTERCEPT}_m. \quad (15)$$

The line equation (15) for each of the projected lane boundary lines 620 can then be compared with the line equation (14) for the observed lane boundary line 610 (e.g., by comparing slope and intercept), and the observed boundary points may be associated with the lane boundary with the best match.

Figure 7:
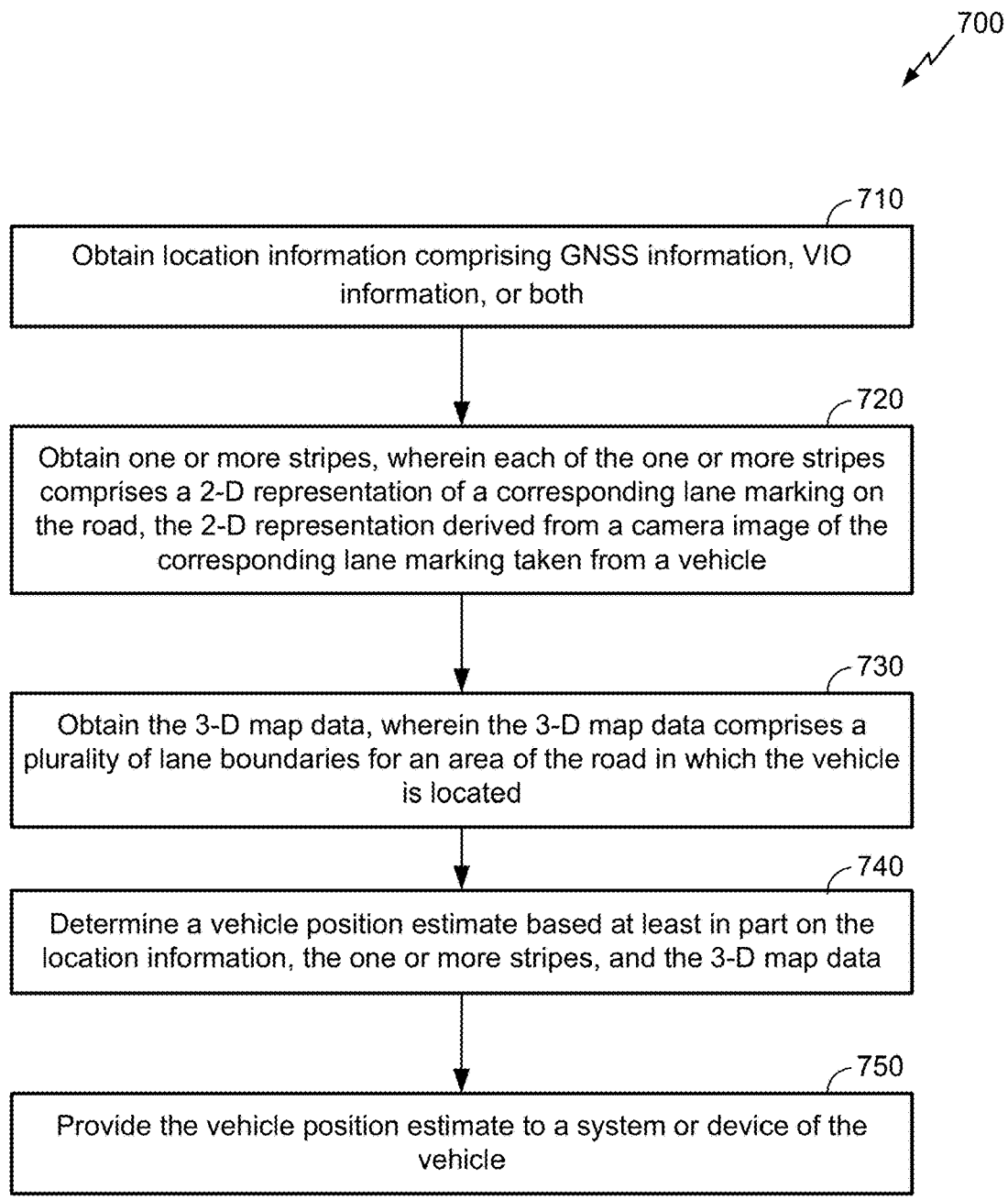
FIG. 7 is a flow diagram of a method of associating vehicle lane markings on a road with 3-D map data, according to an embodiment.

FIG. 7 is a flow diagram of a method 700 of associating vehicle lane markings on a road with 3-D map data, according to an embodiment. Alternative embodiments may perform functions in alternative order, combine, separate, and/or rearrange the functions illustrated in the blocks of FIG. 7, and/or perform functions in parallel, depending on desired functionality. A person of ordinary skill in the art will appreciate such variations. Means for performing the functionality of one or more blocks illustrated in FIG. 7 can include a map fusion unit 280 or, more broadly, a positioning unit 260, for example. Either of these units may be implemented by a processing unit and/or other hardware and/or software components of an on-vehicle computer system, such as the mobile computing system 800 of FIG. 8, described in further detail below. Additionally or alternatively, such means may include specialized hardware as described in relation to FIG. 2.

Figure 8:
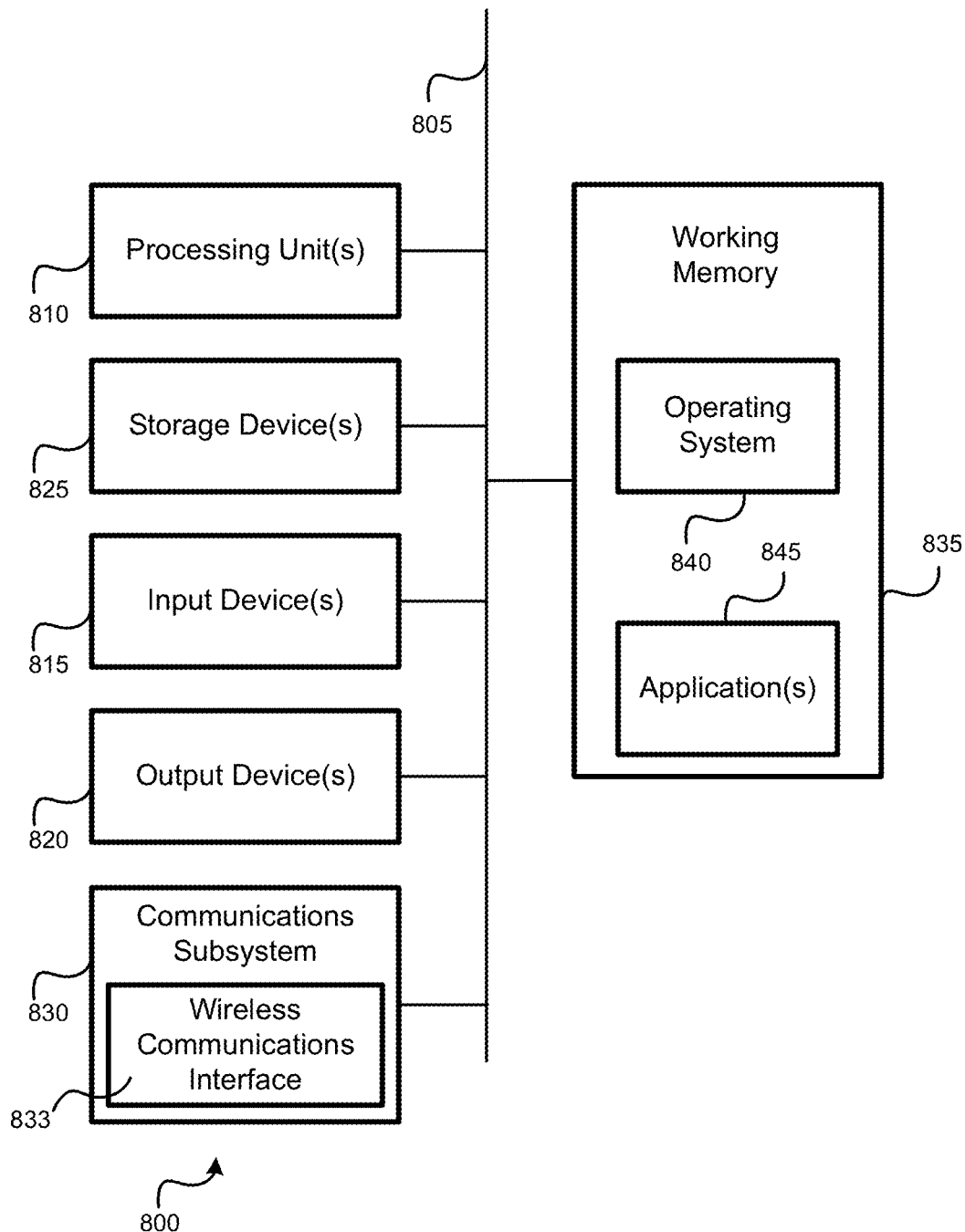
FIG. 8 is a block diagram of an embodiment of a mobile computing system.

At block 710, location information comprising GNSS information, VIO information, or both, is obtained. As previously noted, this information may include a first vehicle position estimate. Additionally or alternatively, this information may comprise underlying GNSS and/or VIO information that can be used to obtain a position estimate. Means for performing the functionality of block 710 may include a bus 805, processing unit(s) 810, input device(s) 815, working memory 835, and/or other components of a mobile computing system 800 as illustrated in FIG. 8 and described in further detail below.

At block 720, one or more stripes is obtained. As noted above, each of the one or more stripes comprises a 2-D representation of a corresponding lane marking on the road, where the 2-D representation is derived from an image of the corresponding lane marking. As previously described, the 2-D representation may comprise a set of points in a 2-D image indicative of where a lane marking is located in the image. The underlying lane marking may vary (e.g., bumps, dots, dashes, single lines, double lines, etc.). Means for performing the functionality of block 720 may include a bus 805, processing unit(s) 810, input device(s) 815, and/or other components of a mobile computing system 800 as illustrated in FIG. 8 and described in further detail below.

At block 730, the functionality includes obtaining the 3-D map data, where the 3-D map data comprises a plurality of lane boundaries for an area of the road in which the vehicle is located. Means for performing the functionality of block 730 may include a bus 805, processing unit(s) 810, storage device(s) 825, and/or other components of a mobile computing system 800 as illustrated in FIG. 8 and described in further detail below.

At block 740, a vehicle position estimate is determined based at least in part on the location information, the one or more stripes, and the 3-D map data. As explained in the embodiments above, the one or more stripes may be associated with lane boundaries within the 3-D map data, which may be used to correct a first position estimate based on the location information. According to some embodiments, a plane can be determined using the 3-D map data. As noted in the embodiments described above, this determination can be made based on a location of at least one lane boundary of the plurality of lane boundaries. For embodiments where lane boundaries comprise a plurality of points (three or more), indicative of the 3-D location of the at least one boundary, the plane may be determined by determining a location of each point of the plurality of points. The one or more stripes may then be projected to the 3-D map frame based on the plane. As previously described, this projection can allow a comparison of the distance between the projected stripes and the lane boundaries in 3-D space. Furthermore, for each of the one or more projected stripes may be associated with a respective one of the plurality of lane boundaries based on distance between the project stripe the respective one of the plurality of lane boundaries. As described elsewhere herein, this "association" of a stripe with a lane boundary allows for a determination of the distance between the stripe in the lane boundary. Because the stripe represents an observation of lane markings made with a camera, it can allow for error correction of the estimated position based on the observation. By their nature, the location of stripes provides information regarding lateral position of the vehicle with respect to observed lane markings, and thus, associating a stripe with a lane boundary from 3-D map data can provide information that is particularly helpful in correcting lateral error, although longitudinal or other error correction may also be made. Thus, according to embodiments, not only can a lane on the road in which the vehicle is located be determined based on the association of each of the one or more projected stripes with a respective one of the plurality of lane boundaries, but also an error in the position estimate of the vehicle may be determined based on the distance between the at least one of the one or more projected stripes and the respective one of the plurality of lane boundaries associated therewith. Based on the determined there, the position estimate the vehicle can be updated. The updated position estimate can then be provided to one or more other systems within a vehicle for use in navigation, vehicle control, or the like. Means for performing the functionality of block 740 may include a bus 805, processing unit(s) 810, and/or other components of a mobile computing system 800 as illustrated in FIG. 8 and described in further detail below.

At block 750, the vehicle position estimate is provided to a system or device of the vehicle. As noted above, a map using unit 280 may provide the vehicle position estimate to any of a variety of devices or systems on the vehicle, including an ADAS system, automated driving system, navigation system, and/or other systems or devices that can utilize vehicle position estimates. Means for performing the functionality of block 740 may include a bus 805, processing unit(s) 810, output device(s) 820, communications subsystem 830, and/or other components of a mobile computing system 800 as illustrated in FIG. 8 and described in further detail below.

As previously noted, embodiments may further include determining an association of at least one of the one or more projected stripes with a respective one of the plurality of lane boundaries associated therewith to be invalid based on one or more testing criteria. According to some embodiments, the one or more testing criteria may comprise whether the distance between the at least one of the one or more projected stripes and the respective one of the plurality of lane boundaries associated therewith is greater than a threshold distance, with her an angle between the least one of the one or more projected stripes and the respective one of the plurality of lane boundaries associated therewith is greater than a threshold angle, whether a proximity of the respective one of the plurality of lane boundaries of the 3-D map associated with the at least one of the one or more projected stripes is within a threshold proximity of another lane boundary of the 3-D map, or any combination thereof. Values for these thresholds vary, depending on desired functionality.

FIG. 8 is a block diagram of an embodiment of a mobile computing system 800, which may be used to perform some or all of the functionality described in the embodiments herein, including the functionality of one or more of the blocks illustrated in FIG. 7. The mobile computing system 800 may be located on a vehicle, and may include some or all of the components of the position estimation system 200 of FIG. 2. For example, the positioning unit 260 of FIG. 2 may be executed by processing unit(s) 810; the IMU 220, camera(s) 210, and/or GNSS unit 230 may be included in the input device(s) 815; and so forth. A person of ordinary skill in the art will appreciate where additional or alternative components of FIG. 2 and FIG. 8 may overlap.

It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different physical locations on a vehicle.

The mobile computing system 800 is shown comprising hardware elements that can be communicatively coupled via a bus 805 (or may otherwise be in communication, as appropriate). The hardware elements may include processing unit(s) 810, which can include without limitation one or more general-purpose processors, one or more special-purpose processors (such as a digital signal processor (DSP), graphical processing unit (GPU), application specific integrated circuit (ASIC), field-programmable gate array (FPGA), and/or the like), and/or other processing structure, which can be configured to perform one or more of the methods described herein, including at least a portion of the method described in FIG. 7. The mobile computing system 800 also can include one or more input devices 815, which can include without limitation a CAN bus (and/or another source of data for various vehicle systems), IMU (and/or one or more accelerometers, gyroscopes, etc.), camera, GNSS receiver, and/or the like; and one or more output devices 820, which can include without limitation a display device, one or more vehicle automation and/or control systems, and/or the like.

The mobile computing system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The mobile computing system 800 may also include a communications subsystem 830, which can include support of communication technologies, including wireless communication technologies managed and controlled by a wireless communication interface 833. The communications subsystem 830 may include a modem, a network card (wireless or wired), an infrared communication device, a wireless communication device, and/or a chipset, and/or the like. The communications subsystem 830 may include one or more input and/or output communication interfaces, such as the wireless communication interface 833, to permit data to be exchanged with a wireless network, mobile devices, other computer systems, and/or other electronic devices. A wireless network may include a cellular network or other wireless wide area network (WWAN), a wireless local area network (WLAN), and/or the like.

In many embodiments, the mobile computing system 800 will further comprise a working memory 835, which can include a RAM and/or or ROM device. Software elements, shown as being located within the working memory 835, can include an operating system 840, device drivers, executable libraries, and/or other code, such as application(s) 845, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIG. 7, may be implemented (in whole or in part) as code and/or instructions that are stored (e.g. temporarily) in working memory 835 and are executable by a computer (and/or a processing unit within a computer such as processing unit(s) 810); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as mobile computing system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the mobile computing system 800 and/or might take the form of source and/or installable code, which, upon compilation and/or installation on the mobile computing system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of associating vehicle lane markings on a road with 3-D map data for vehicle position estimation, the method comprising:
   obtaining location information comprising Global Navigation Satellite System (GNSS) information, Visual Inertial Odometery (VIO) information, or both;
   obtaining one or more stripes, wherein each of the one or more stripes comprises a 2-D representation of a corresponding lane marking on the road, the 2-D representation derived from a camera image of the corresponding lane marking taken from a vehicle;
   obtaining the 3-D map data, wherein the 3-D map data comprises a plurality of lane boundaries for an area of the road in which the vehicle is located;
   determining a plane using the 3-D map data;
   projecting the one or more stripes onto the plane;
   associating each of the one or more projected stripes with a respective one of the plurality of lane boundaries based on a distance between the projected stripe and the respective one of the plurality of lane boundaries;
   determining a vehicle position estimate based at least in part on the location information, the one or more stripes, and the 3-D map data; and
   providing the vehicle position estimate to a system or device of the vehicle.

2. The method of claim 1, further comprising determining, based on the association of each of the one or more projected stripes with the respective one of the plurality of lane boundaries, a lane on the road in which the vehicle is located.

3. The method of claim 1, further comprising:
   determining, based on the distance between the one or more projected stripes and the respective one of the plurality of lane boundaries associated therewith, an error in a position estimate of the vehicle; and
   updating the position estimate of the vehicle based on the determined error.

4. The method of claim 1, wherein determining the plane using the 3-D map data comprises determining a 3-D location of at least one lane boundary of the plurality of lane boundaries.

5. The method of claim 4, wherein determining the 3-D location of the at least one lane boundary comprises determining a 3-D location of each point of a plurality of points indicative of the 3-D location of the at least one lane boundary.

6. The method of claim 1, further comprising determining an association of at least one of the one or more projected stripes with the respective one of the plurality of lane boundaries associated therewith to be invalid based on one or more testing criteria.

7. The method of claim 6, wherein the one or more testing criteria comprises:
   whether the distance between the at least one of the one or more projected stripes and the respective one of the plurality of lane boundaries associated therewith is greater than a threshold distance,
   whether an angle between the at least one of the one or more projected stripes and the respective one of the plurality of lane boundaries associated therewith is greater than a threshold angle, or whether a proximity of the respective one of the plurality of lane boundaries of the 3-D map associated with the at least one of the one or more projected stripes is within a threshold proximity of another lane boundary of the 3-D map data, or any combination thereof.

8. The method of claim 1, further comprising:

determining a plane on which the vehicle is located;

projecting the one or more stripes onto the plane;

projecting the 3-D map data onto the plane; and associating each of the one or more projected stripes with a respective one of the plurality of lane boundaries based on a comparison of lines representative of the one or more projected stripes with a line representative of the respective one of the plurality of lane boundaries.

9. The method of claim 8, further comprising determining, based on the association of each of the one or more projected stripes with the respective one of the plurality of lane boundaries, a lane on the road in which the vehicle is located.

10. The method of claim 8, further comprising:

determining, based on a distance between at least one of the one or more projected stripes and the respective one of the plurality of lane boundaries associated therewith, an error in a position estimate of the vehicle; and updating the position estimate of the vehicle based on the determined error.

11. A device for associating vehicle lane markings on a road with 3-D map data for vehicle position estimation, the device comprising:

a memory; and a processing unit communicatively coupled with the memory and configured to:

obtain location information comprising Global Navigation Satellite System (GNSS) information, Visual Inertial Odometery (VIO) information, or both;

obtain one or more stripes, wherein each of the one or more stripes comprises a 2-D representation of a corresponding lane marking on the road, the 2-D representation derived from a camera image of the corresponding lane marking taken from a vehicle;

obtain the 3-D map data, wherein the 3-D map data comprises a plurality of lane boundaries for an area of the road in which the vehicle is located;

determine a plane using the 3-D map data;

project the one or more stripes onto the plane;

associate each of the one or more projected stripes with a respective one of the plurality of lane boundaries based on a distance between the projected stripe and the respective one of the plurality of lane boundaries;

determine a vehicle position estimate based at least in part on the location information, the one or more stripes, and the 3-D map data; and provide the vehicle position estimate to a system or device of the vehicle.

12. The device of claim 11, wherein the processing unit is further configured to determine, based on the association of each of the one or more projected stripes with the respective one of the plurality of lane boundaries, a lane on the road in which the vehicle is located.

13. The device of claim 11, wherein the processing unit is further configured to:

determine, based on the distance between the one or more projected stripes and the respective one of the plurality of lane boundaries associated therewith, an error in a position estimate of the vehicle; and update the position estimate of the vehicle based on the determined error.

14. The device of claim 11, wherein, to determine the plane using the 3-D map data, the processing unit is configured to determine a 3-D location of at least one lane boundary of the plurality of lane boundaries.

15. The device of claim 14, wherein, to determine the 3-D location of the at least one lane boundary, the processing unit is configured to determine a 3-D location of each point of a plurality of points indicative of the 3-D location of the at least one lane boundary.

16. The device of claim 11, wherein the processing unit is further configured to determine an association of at least one of the one or more projected stripes with the respective one of the plurality of lane boundaries associated therewith to be invalid based on one or more testing criteria.

17. The device of claim 16, wherein the one or more testing criteria on which the processing unit is configured to base the determination of the association of the at least one of the one or more projected stripes with the respective one of the plurality of lane boundaries associated therewith comprise:

whether the distance between the at least one of the one or more projected stripes and the respective one of the plurality of lane boundaries associated therewith is greater than a threshold distance, whether an angle between the at least one of the one or more projected stripes and the respective one of the plurality of lane boundaries associated therewith is greater than a threshold angle, or whether a proximity of the respective one of the plurality of lane boundaries of the 3-D map associated with the at least one of the one or more projected stripes is within a threshold proximity of another lane boundary of the 3-D map data, or any combination thereof.

18. The device of claim 11, wherein the processing unit is further configured to:

determine a plane on which the vehicle is located;

project the one or more stripes onto the plane;

project the 3-D map data onto the plane; and associate each of the one or more projected stripes with a respective one of the plurality of lane boundaries based on a comparison of lines representative of the one or more projected stripes with a line representative of the respective one of the plurality of lane boundaries.

19. The device of claim 18, wherein the processing unit is further configured to determine, based on the association of each of the one or more projected stripes with the respective one of the plurality of lane boundaries, a lane on the road in which the vehicle is located.

20. The device of claim 18, wherein the processing unit is further configured to:

determine, based on a distance between at least one of the one or more projected stripes and the respective one of the plurality of lane boundaries associated therewith, an error in a position estimate of the vehicle; and update the position estimate of the vehicle based on the determined error.

21. A device comprising:

means for obtaining location information comprising Global Navigation Satellite System (GNSS) information, Visual Inertial Odometery (VIO) information, or both;

means for obtaining one or more stripes, wherein each of the one or more stripes comprises a 2-D representation of a corresponding lane marking on a road, the 2-D representation derived from a camera image of the corresponding lane marking taken from a vehicle;

means for obtaining 3-D map data, wherein the 3-D map data comprises a plurality of lane boundaries for an area of the road in which the vehicle is located;

means for determining a plane using the 3-D map data;

means for projecting the one or more stripes onto the plane;

means for associating each of the one or more projected stripes with a respective one of the plurality of lane boundaries based on a distance between the projected stripe and the respective one of the plurality of lane boundaries;

means for determining a vehicle position estimate based at least in part on the location information, the one or more stripes, and the 3-D map data; and means for providing the vehicle position estimate to a system or device of the vehicle.

22. The device of claim 21, further comprising means for determining, based on the association of each of the one or more projected stripes with the respective one of the plurality of lane boundaries, a lane on the road in which the vehicle is located.

23. The device of claim 21, further comprising:

means for determining, based on the distance between the one or more projected stripes and the respective one of the plurality of lane boundaries associated therewith, an error in a position estimate of the vehicle; and means for updating the position estimate of the vehicle based on the determined error.

24. The device of claim 21, further comprising:

means for determining a plane on which the vehicle is located;

means for projecting the one or more stripes onto the plane;

means for projecting the 3-D map data onto the plane; and means for associating each of the one or more projected stripes with a respective one of the plurality of lane boundaries based on a comparison of lines representative of the one or more projected stripes with a line representative of the respective one of the plurality of lane boundaries.

25. The device of claim 24, further comprising means for determining, based on the association of each of the one or more projected stripes with the respective one of the plurality of lane boundaries, a lane on the road in which the vehicle is located.

26. The device of claim 24, further comprising:

means for determining, based on a distance between at least one of the one or more projected stripes and the respective one of the plurality of lane boundaries associated therewith, an error in a position estimate of the vehicle; and means for updating the position estimate of the vehicle based on the determined error.

27. A non-transitory computer-readable medium having instructions embedded thereon for associating vehicle lane markings on a road with 3-D map data for vehicle position estimation, wherein the instructions, when executed by one or more processing units, cause the one or more processing units to:

obtain location information comprising Global Navigation Satellite System (GNSS) information, Visual Inertial Odometery (VIO) information, or both;

obtain one or more stripes, wherein each of the one or more stripes comprises a 2-D representation of a corresponding lane marking on the road, the 2-D representation derived from a camera image of the corresponding lane marking taken from a vehicle;

obtain the 3-D map data, wherein the 3-D map data comprises a plurality of lane boundaries for an area of the road in which the vehicle is located;

determine a plane using the 3-D map data;

project the one or more stripes onto the plane;

associate each of the one or more projected stripes with a respective one of the plurality of lane boundaries based on a distance between the projected stripe and the respective one of the plurality of lane boundaries;

determine a vehicle position estimate based at least in part on the location information, the one or more stripes, and the 3-D map data; and provide the vehicle position estimate to a system or device of the vehicle.

* * * * *